United States Patent [19]
Orzi et al.

[11] Patent Number: 5,731,898
[45] Date of Patent: Mar. 24, 1998

[54] OPTICAL FILTER ARRANGEMENT

[75] Inventors: Domenico Orzi, 100 Forrest Road, Atholl, Sandton; Ettienne Theron, Pretoria, both of South Africa

[73] Assignees: Domenico Orzi; Guido Orzi, Rome, Italy

[21] Appl. No.: 417,983

[22] Filed: Apr. 6, 1995

[30] Foreign Application Priority Data

Apr. 12, 1994 [ZA] South Africa ............... 94/2502
Nov. 28, 1994 [ZA] South Africa ............... 94/9414

[51] Int. Cl.$^6$ .................. G02B 1/10; G02B 5/28; G02B 5/22
[52] U.S. Cl. .................. 359/587; 359/589; 359/585; 359/891
[58] Field of Search .................. 359/360, 585, 359/587, 588, 589, 590; 356/108

[56] References Cited

U.S. PATENT DOCUMENTS

| | | | |
|---|---|---|---|
| 2,519,545 | 8/1950 | Colbert et al. | 359/584 |
| 3,612,692 | 10/1971 | Kruppa et al. | 356/108 |
| 4,313,648 | 2/1982 | Yano et al. | 359/587 |
| 4,619,504 | 10/1986 | Daniels et al. | |
| 5,149,351 | 9/1992 | Yaba et al. | |
| 5,164,858 | 11/1992 | Aguilera et al. | 359/587 |
| 5,337,191 | 8/1994 | Austin | 359/360 |

FOREIGN PATENT DOCUMENTS 0103217  3/1984  European Pat. Off.
89/9669  12/1986  South Africa.

OTHER PUBLICATIONS

Patent Abstracts of Japan, vol. 18, No. 197, (P-1723) (6537) 100 P 1723, dated Apr. 6, 1994.

Primary Examiner—Paul M. Dzierzynski
Assistant Examiner—Audrey Chang
Attorney, Agent, or Firm—Clifford W. Browning; Woodard, Emhardt, Naughton Moriarty & McNett

[57] ABSTRACT

An optical filter arrangement comprises at least two optical filter elements including a transparent substrate and an optical coating typically comprising at least two overlying optical thin films. The coating defines a first patterned area and a second surround area bordering the first area. The first area has substantially the same optical transmittance characteristics as the second area and different optical reflectance characteristics over at least a portion of the visible spectrum. The distinction between the first area and the second area is visually perceptible when viewed from one side of the optical filter arrangement and is substantially visually imperceptible when viewed from the opposite side of the optical filter arrangement. As a result, a coloured pattern or logo is only visible when viewed from one side of the filter arrangement. The invention extends to a method of forming such an arrangement.

2 Claims, 7 Drawing Sheets

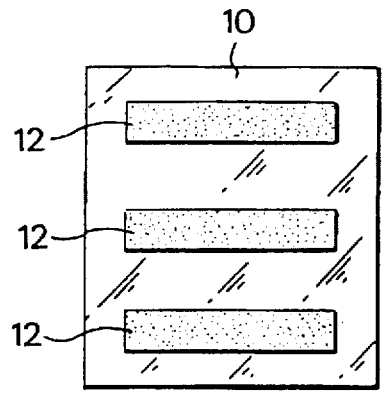
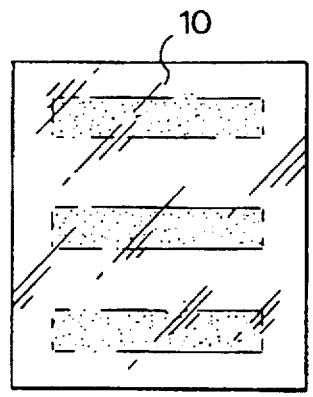
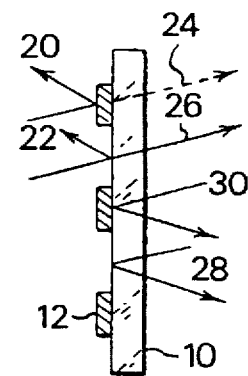
FIG. 1A
(Prior Art)
FIG. 1B
(Prior Art)
FIG. 1C
(Prior Art)
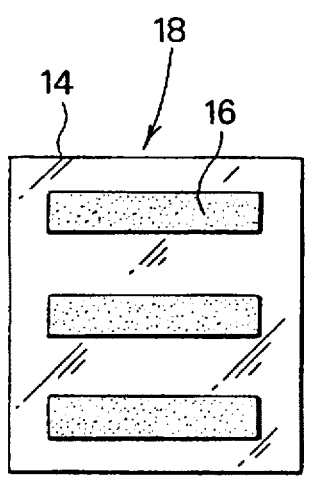
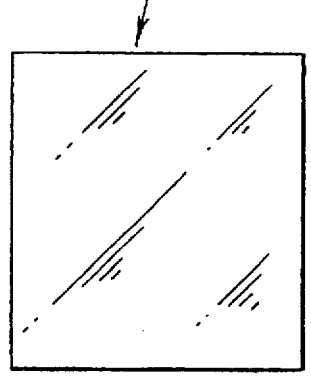
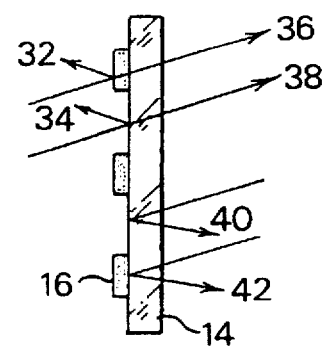
FIG. 2A
FIG. 2B
FIG. 2C

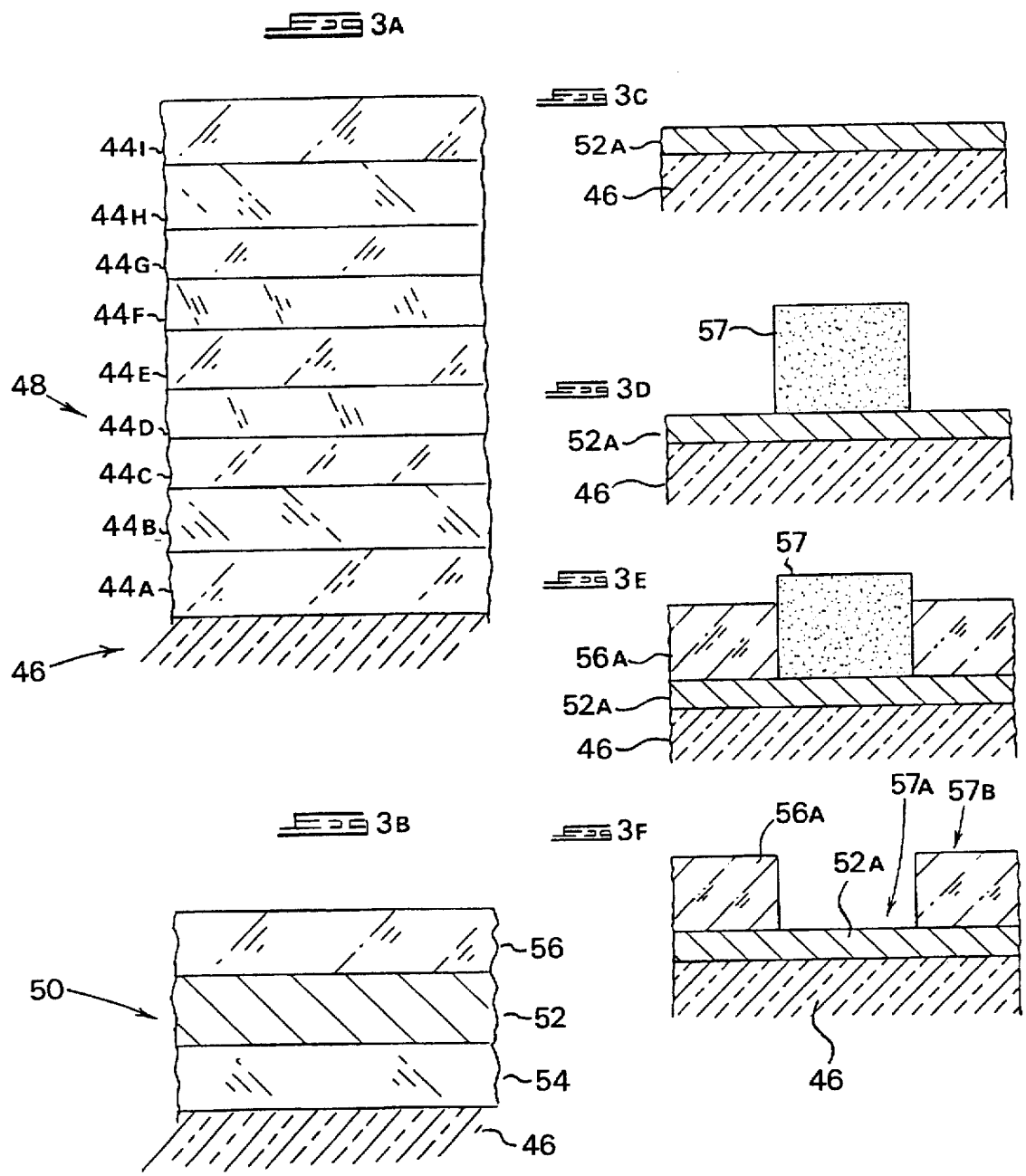

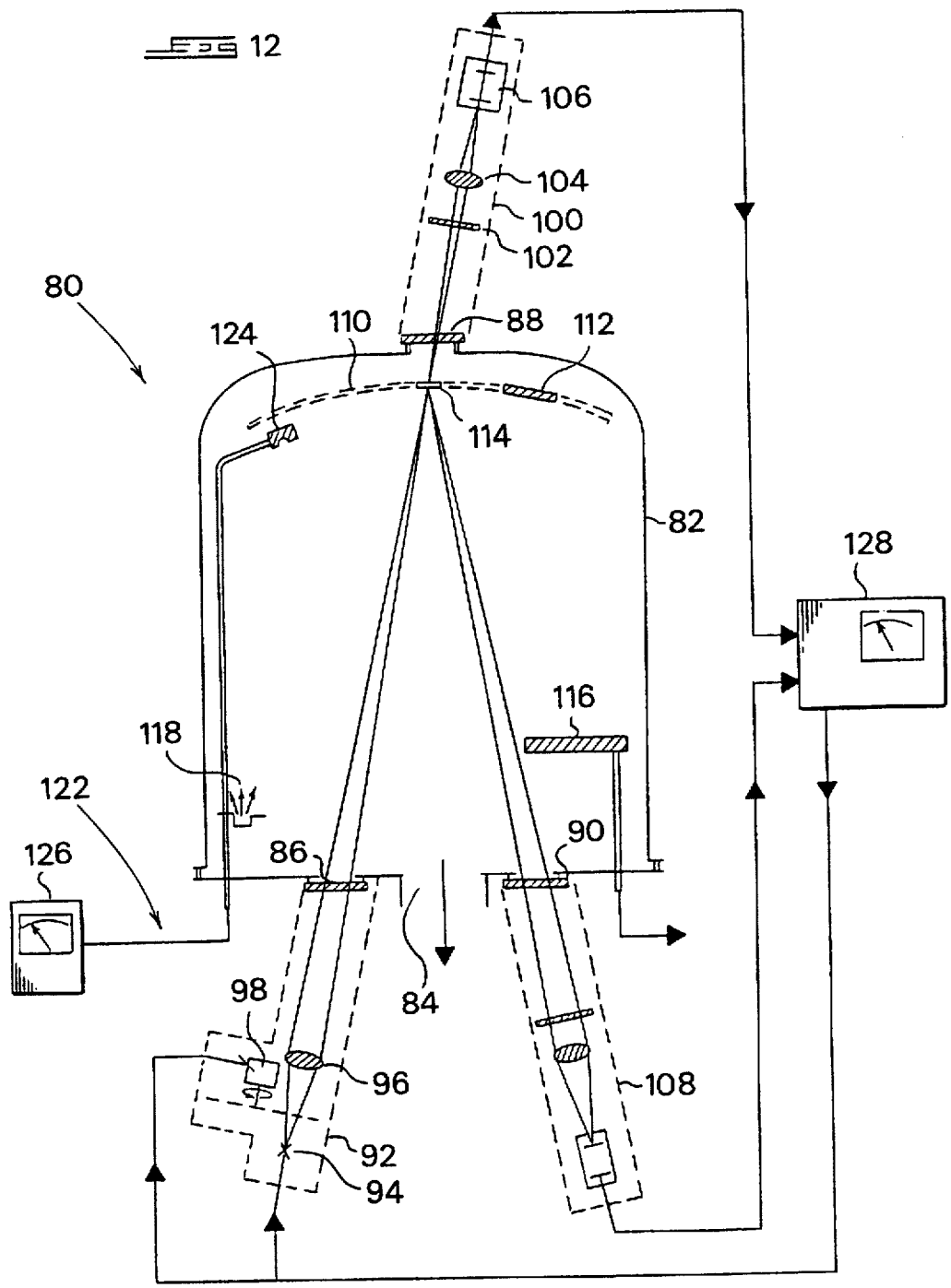

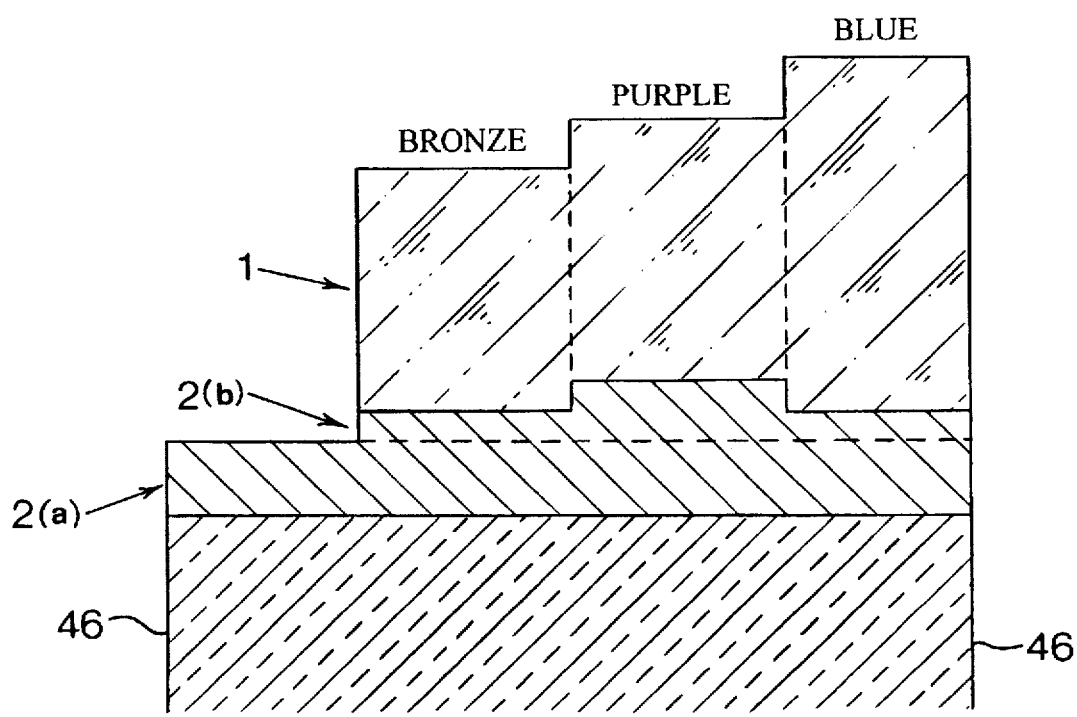

5,731,898

OPTICAL FILTER ARRANGEMENT

BACKGROUND TO THE INVENTION

THIS invention relates to an optical filter arrangement having differential reflection and uniform transmission characteristics.

All patterns, signs and logos on shop windows, sunglasses, windscreens and other transparent constructions are visible when viewed from both sides of the constructions. In many cases, it is preferable that such patterns, logos and signs be visible when viewed from one side only. For example, it is desirable that a viewer has unimpeded vision when looking through a pair of sunglasses or a car windscreen, and stickers, decals and any other opaque logos or images which are intended to be visible when viewed from the outside will impede the vision of the person wearing the sunglasses or looking through the windscreen.

U.S. Pat. No. 4,925,705 discloses a method of producing superimposed layers which register in one or more areas. The layers are printed on a substrate over a mask which defines the areas. The printed areas combine to form a printed image on a transparent substrate which is visible when viewed from the printed side of the substrate and substantially invisible when viewed from the opposite side due to the closeness of the matrix of dots to the eye of the viewer and the inability of the eye to focus on such dots. An arrangement of the type described is optically unsound, in that the matrix limits the passage of light through the glasses and may also tend to create focusing problems. Consequently, such glasses cannot be used as sunglasses, and merely have a novelty or gimmick appeal.

U.S. Pat. No. 4,619,504 discloses an ophthalmic lens with a marking and a method of producing the marking. A removable adhering substance is applied in a predetermined pattern to the surface of the lens, and an anti-reflection coating is subsequently applied directly to the surface of the lens body outside the region. The removable substance is then removed so that the marking is defined by a reflective pattern surrounded by a non-reflective coating. A marking of this type is not readily discernable due to the optically neutral nature of the marking, and is designed to be used solely for identification rather than advertising purposes.

SUMMARY OF THE INVENTION

According to a first aspect of the invention there is provided an optical filter arrangement comprising at least two optical filter elements, the optical filter elements defining a first area and a second area bordering the first area, the first area having substantially the same optical transmittance characteristics as the second area and different optical reflectance characteristics over at least a portion of the visible spectrum, whereby the distinction between the first area and the second area is visually perceptible when viewed from one side of the optical filter arrangement and is substantially visually imperceptible when viewed from the opposite side of the optical filter arrangement.

Preferably, the one side of the optical filter arrangement is a patterned side and the opposite side of the optical filter is a non-patterned side, and the distinction between the first area and the second area is also substantially visually imperceptible when viewed from the non-patterned side of the optical filter in reflected light.

In a preferred form of the invention, the optical filter elements include a transparent substrate and at least one optical coating applied to the substrate in a predetermined pattern.

The coating typically includes a plurality of overlying optical thin films, which may be in the form of metallic thin films, dielectric thin films, mixed thin films comprising a metal-dielectric mixture or combinations of the above thin films.

In one form of the invention, the optical filter arrangement comprises a subjacent metallic thin film and a superjacent dielectric thin film, with the thickness of the metallic thin film determining the transmittance of the filter arrangement and the thickness of the dielectric thin film determining the colour of reflection of the first or second areas, and may include at least one subjacent dielectric thin film interposed between the metallic thin film and the substrate for reducing back or reverse reflection.

In an alternative form of the invention, the optical thin films comprise a stack of dielectric thin films, with contiguous thin films in the stack having differing refractive indices.

The transparent substrate may incorporate integral filtering means adapted to reduce transmission imbalance in a spectral region so as to provide a transmission colour balance.

The invention extends to a method of forming an optical filter arrangement comprising the steps of:

providing an optical substrate;

selecting an optical coating and applying it to one face of the substrate; and forming a predetermined pattern in the coating so as to define first and second areas;

whereby the first area has substantially the same optical transmittance characteristics but has different optical reflectance characteristics over at least a portion of the visible spectrum compared to the second area so that the distinction between the first and second areas is visually perceptible when viewed from one side of the optical filter arrangement and is substantially visually imperceptible when viewed from the opposite side of the optical filter arrangement.

Preferably, the optical coating and the substrate are chosen so that the backside reflectance of both the first and second areas when viewed from the opposite side of the filter arrangement in reflected light is substantially identical.

The optical coating conveniently comprises at least two overlying optical thin film layers and the step of applying the optical coating comprises the steps of applying the thin film layers to the substrate, masking at least one of the thin film layers using a mask which defines said pattern, and removing the mask.

The method may include the step of monitoring the thicknesses of the optical thin film layers so as to achieve the desired optical transmittance and reflectance characteristics.

The method may further include the steps of providing a reference light source, a transmitted light sensor and a reflected light sensor, interposing a monitoring substrate between the light source and the transmitted light sensor, depositing at least one optical thin film layer onto the monitoring substrate in a continuous deposition process, measuring the transmitted and reflected light during the deposition process, and terminating the deposition process when the desired optical transmittance and reflectance characteristics have been achieved.

Typically, the method includes the further steps of providing at least one substrate in a region of the monitoring substrate and subjecting the substrate to the same deposition process as the monitoring substrate.

The method typically includes the step of detecting a spectral region of transmission colour imbalance and providing the substrate with filtering means to reduce the transmission colour imbalance in the spectral region.

The thin film layers may be applied by a vapour deposition process, a photo-lithographic process, a dipping process, a spraying process or a sputtering process.

It must be understood that the term "pattern" denotes any form of marking, logo, picture, device or the like.

BRIEF DESCRIPTION OF THE DRAWINGS

FIGS. 1A, 1B and 1C show highly schematic respective front, rear and side views of a conventional opaque pattern on a transparent substrate;

FIGS. 2A, 2B and 2C show highly schematic respective front, rear and side views of a filter arrangement of the invention;

FIG. 3A shows a cross-sectional side view of a multi-layer dielectric stack forming one embodiment of a filter arrangement of the invention;

FIG. 3B shows a multi-layer metallic and dielectric stack forming a further embodiment of a filter arrangement of the invention;

FIGS. 3C to 3F show various stages in the fabrication of a two-layer metallic and dielectric stack forming a still further embodiment of the invention;

FIG. 12 shows a partly schematic view of an experimental coating plant.

DESCRIPTION OF THE EMBODIMENTS

Figure 4:
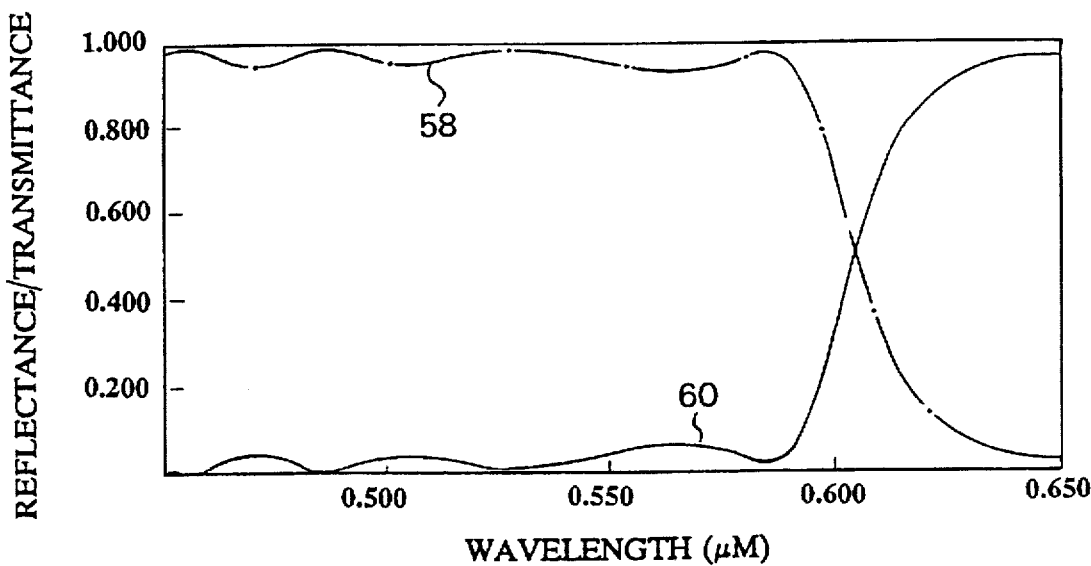
FIG. 4 shows a graph of the transmittance and reflectance of a red reflecting thin film dielectric stack.

Referring first to FIGS. 1A to 1C, which have been provided for the purposes of comparison only, a transparent substrate such as a sheet of glass 10 is provided with a pattern comprising three opaque strips 12. As is clear from FIGS. 1A and 1B, the pattern is clearly visible when viewed from both sides of the glass.

In FIG. 1C, the reflectance 20 of the pattern 12 and the reflectance 22 of the background glass 10 differs. The transmittance 24 of light passing through the pattern is effectively zero, and differs substantially from the transmittance 26 of the background or surround area. Further, the reverse reflectance 28 of the background clearly differs substantially from the reverse reflectance 30 of the pattern 12.

Referring now to FIGS. 2A to 2C, a glass sheet 14 is shown having a patterned area in the form of three strips 16 bordered by a surround area, with the glass sheet 14 and the strips 16 constituting a filter arrangement 18 of the invention. As is clear from FIG. 2A, the strips 16 are clearly visible in reflected light. However, when the glass sheet is turned around and the filter arrangement 18 is viewed from the opposite side, the patterned area 16 merges with the surround area and is invisible, as is shown in FIG. 2B. This is quantified in FIG. 2C, which illustrates how the reflectance of the pattern 32 and the reflectance of the background or surround area 34 differ, as in the prior art example of FIGS. 1A to 1C. However, the transmittance 36 of light passing through the pattern 16 is substantially identical to the transmittance of light 38 passing through the surround area. As a result, the pattern 16 is substantially invisible when viewed from the opposite side of the glass.

As a further feature, the backside or reverse reflectance 40 of the background is matched with the backside reflectance 42 of the patterned area 16. This further reduces the visibility of the pattern when viewed from the opposite side of the glass, as per FIG. 2B.

As a result of the pattern 16 having to be transparent, it is clear that the materials used to form the pattern have to be transparent or at least partially transparent and colour selective. Optical thin films display optical interference phenomena to create reflectance differences, while still retaining substantially identical transmission properties. Such films are defined as being thin enough to allow optical interference between layers, and are typically of the order of 50 to 100 nm thick.

Optical thin films can be divided into four categories, namely dielectric films, metal films, metal/dielectric combinations and metal/dielectric mixtures.

Dielectric films are insulators which have an extremely low electrical conductivity. Typical materials include quartz, aluminium oxide, magnesium fluoride and the like. These films have no optical absorption properties and are defined by the refractive index of the layer and its thickness. As is clear from FIG. 3A, the required spectral reflection and transmission characteristics of a dielectric system on a substrate is accomplished by stacking a number of dielectric thin film layers 44A to 44I with different refractive indices and thicknesses in an ordered stacked arrangement on a transparent substrate so as to create a dielectric thin film stack 48. Alternating layers of $TiO_2$, having a high refractive index of approximately 2.35, and $SiO_2$, having a low refractive index of about 1.45, are typically provided.

In theory, any reflectance characteristic can be realised. However, as the reflectances are non-absorbing and are substantially the same from both sides of the thin film system, as are the transmittances, what is seen as a colour in reflection is lost in transmission so that colour balance looking through the pattern and the background substrate has to be accomplished by some means of filtering in the substrate. In FIG. 4, respective transmittance and reflectance graphs 58 and 60 of a red reflecting thin film filter arrangement are shown. The arrangement comprises thin film alternating high and low refractive index layers on a clear glass substrate which appears red in reflection and blue/green in transmission.

Figure 5:
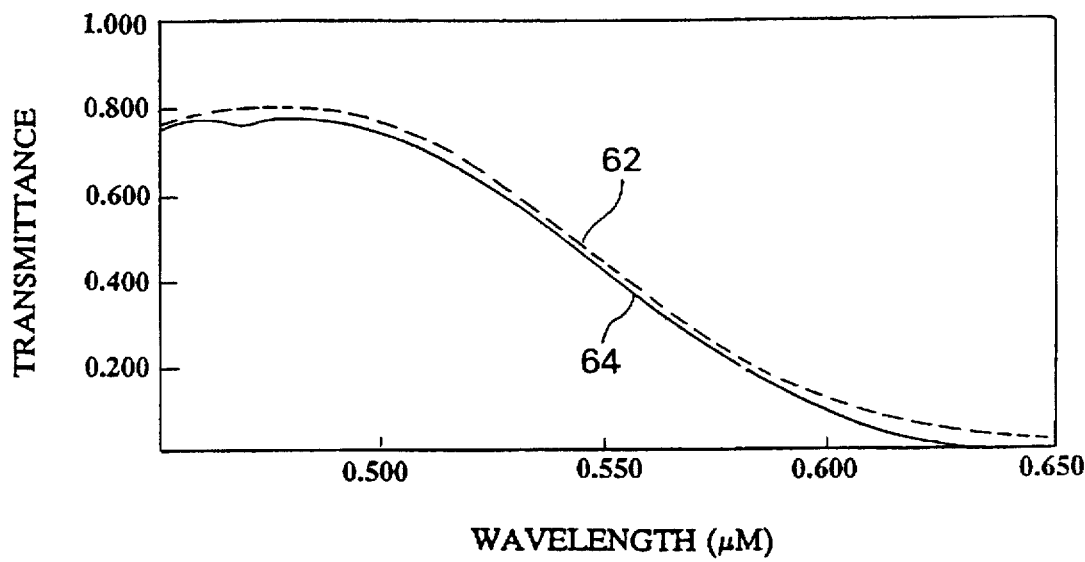
FIG. 5 shows a graph illustrating transmission matching using a coloured filter glass as a substrate.

It is evident that a clearly noticeable difference exists between the transmittance through the blue-green pattern and the clear background. By eliminating the spectral region where the imbalance is the greatest, a colour balance is possible. This is illustrated in FIG. 5 where a coloured filter glass is used as substrate to absorb the red portion of the spectrum through the background so as to create balance in transmission. The transmittance through the substrate is plotted in broken outline at 62 and the transmittance through both the substrate and the pattern is illustrated in solid outline at 64. The close matching of both curves for all visible wavelengths is clearly apparent. This concept of using substrate filtering together with dielectric thin film systems can be expanded for other colours as well.

Multi-layer optical filter systems are normally produced by the so-called physical vapour deposition method (PVD), where the materials are vaporised under high vacuum and condensed in a controlled manner onto the substrates. Alternatively, techniques such as sputtering, magnetron sputtering, ion-assisted PVD methods and chemical dipping or spraying processes may be used.

A second category of optical thin film that can be used comprises metal films, which are characterised by their high electrical conductivity, optical absorption characteristics and complex refractive indices. Typical metal films include chromium, aluminium, silver, nickel and the like. As is the case with dielectric films, the transmittance of a metallic layer such as chromium is the same regardless from which direction it is viewed. The same is not applicable for the reflectance of a metallic film, as the reflection from the air side is typically higher than that from the substrate side because of the absorption in the metallic layer and the difference in refractive indices of air in the substrate.

A further optical thin film arrangement is illustrated in Fibre 3B, and comprises a thin film stack 50 comprising a metallic layer 52 sandwiched between lower and upper dielectric layers 54 and 56. By adding the dielectric layers, it is possible to change the colour and magnitude of the reflection from one side of the layer with little change in the transmission through the layer as well as in the reflection from the other side of the layer. The thickness of the uppermost dielectric layer 56 determines the colour of the reflection while the thickness of the metallic layer determines the value of the transmission through the stack. By insertion of the dielectric layer 54 beneath the metal layer 52, the back or reverse reflectance can be adjusted.

The metallic layer 52 can also be replaced or complimented by a metal/dielectric mixture providing a dark background. By adding dielectric layers on top of the metal/dielectric mixture, patterns of high reflectivity can be produced.

Referring now to FIGS. 3C to 3F, the steps involved in fabricating a basic embodiment of a filter arrangement of the invention are shown. As a first step, a metallic Cr layer 52A is vapour deposited onto the substrate 46. A masking layer 57 formed from a removable ink or the like is then deposited in a predetermined pattern onto the Cr layer 52A. An uppermost dielectric layer 56A formed from SiO is then vapour deposited onto the Cr layer 52A, with the masking layer 57 serving to mask out the patterned area. As a final step, the masking layer 57 is removed, as is clear from FIG. 3F, so as to define a patterned area 57A bordered by a surround area 57B.

Further designs will be based on the optical parameters of Cr as the metal and SiO as the dielectric thin film layers, with Schott BK7 glass being used as the substrate. The reasons for this choice of materials are that Cr and SiO form hard and durable layers, are easy to use, and the optical parameters of both Cr and SiO are well known so that fairly reliable theoretical simulations can be made.

A 30% transmittance at 550 nm was taken as standard for the transmittance of the filters so that, combined with a filter substrate, the transmittance is between 10% and 20%, as this is the transmittance value associated with sunglasses.

As an infinite number of colours can be produced by optical thin film techniques, the colours of the background are divided into four sample categories that are readily obtainable, namely; "Neutral", "Bronze", "Purple" and "Blue", indicating roughly the hues of colour that will be seen on looking onto the substrate.

The simplest practical designs thus far achieved are depicted in Table 1. These designs are closely matched in terms of transmittance and ease of application.

TABLE 1

| Layer | Material | Neutral | Bronze | Purple | Blue |
|-------|----------|---------|--------|--------|------|
| 0 | Air | — | — | — | — |
| 1 | SiO | — | 42 nm | 55 nm | 72 nm |
| 2 | Cr | 14.9 nm | 21.3 nm | 22.7 nm | 20.9 nm |
| Substrate | BK7 | BK7 | BK7 | BK7 | BK7 |

Figure 6:
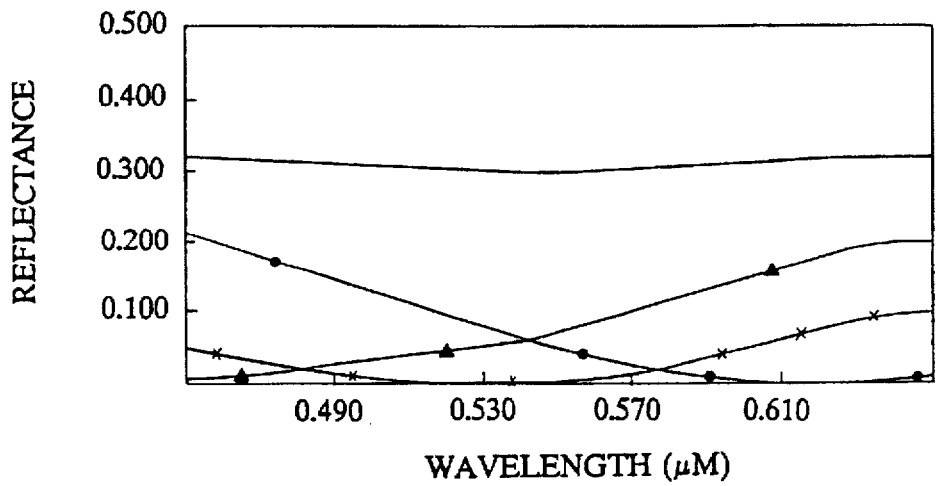
FIG. 6 shows a graph illustrating the reflectance of neutral, bronze, purple and blue logos.
Figure 7:
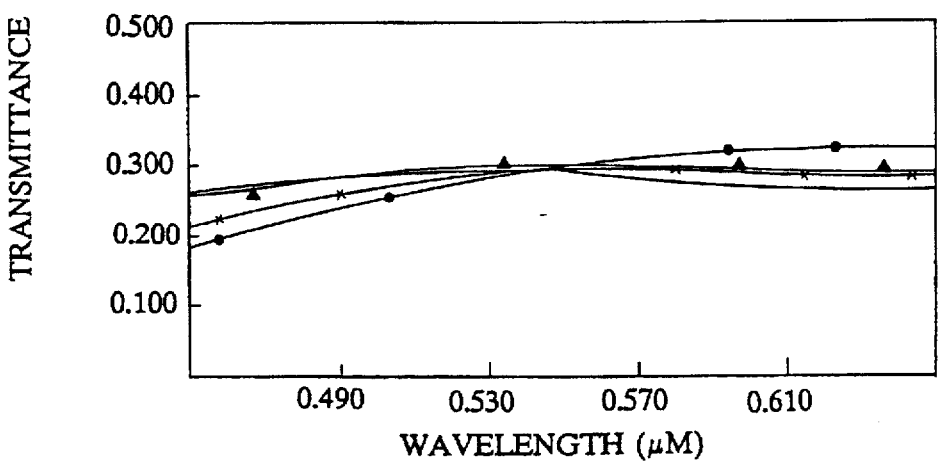
FIG. 7 shows a graph of the transmittance of the neutral, bronze, purple and blue logos.
Figure 8:
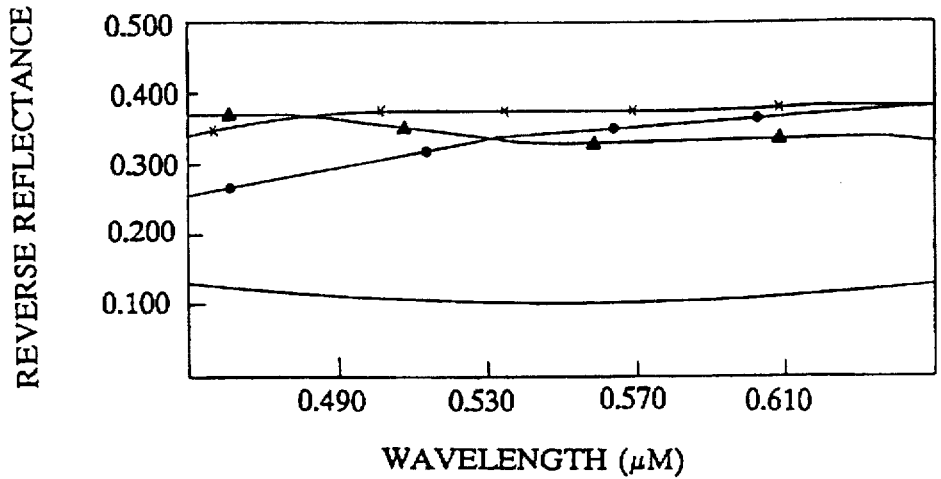
FIG. 8 shows a graph of the reverse reflectances of the coloured logos.

Reflectance and transmittance data are depicted in FIGS. 6 and 7 respectively. The reverse reflectance (the reflectance as viewed from the back of the substrate) is shown in FIG. 8. In all of the graphs of FIGS. 6 to 9, the neutral plot is indicated in solid outline, the bronze plot is indicated in triangular outline, the purple plot is indicated in crossed outline and the blue plot is indicated in circled outline.

The transmission balance for the neutral and bronze filters over the whole of the visible spectrum is relatively good, whereas the transmission balance between the neutral and the other two colours gets progressively worse, and requires some filtering to obtain sufficient colour balance. The reverse reflectance differs significantly between the neutral filter and the three coloured designs, which match fairly closely.

This difference in reverse reflection can be masked by using a neutral density substrate having a transmission of approximately 50%, or by putting a mildly reflecting layer on the backside of the substrate, so as to mask the difference in reflection.

A base layer of Cr is applied over the full area, the logo area is masked off and a matching layer of Cr plus the SiO layer is coated in order to create the background shade. A coloured substrate which eliminates a portion of the blue region of the spectrum may help to balance the transmittance. Additional matching layer/s may be necessary to match the transmittances. By adding an extra layer underneath the pattern, some control over the spectral characteristics of the transmittance is possible.

The reverse reflectances of the neutral logo on the three different colour backgrounds as depicted in FIG. 8 differ appreciably and matching can only be done by heavy masking using neutral density substrates. With the coloured pattern or logo on different backgrounds as set out in Table 1, and shown in FIG. 8, the reverse reflection matching improves dramatically, such that no masking with neutral density substrates will be necessary. The only negative aspect of this reverse reflection matching is the relatively high reflectance value which may be bothersome when used without screening by a filter substrate.

The following table depicts the three colour designs and the neutral design discussed thusfar, with the addition of a lowermost SiO layer 54 to reduce reverse reflectance, as per FIG. 3B.

TABLE 2

| Layer | Material | Neutral | Bronze | Purple | Blue |
|---|---|---|---|---|---|
| 0 | Air | — | — | — | — |
| 1 | SiO | — | 42 nm | 55 nm | 72 nm |
| 2 | Cr | 16.3 nm | 27.1 nm | 28.5 nm | 25.5 nm |
| 3 | SiO | 72 nm | 72 nm | 72 nm | 72 nm |
| Substrate | Glass | Glass | Glass | Glass | Glass |

Figure 9:
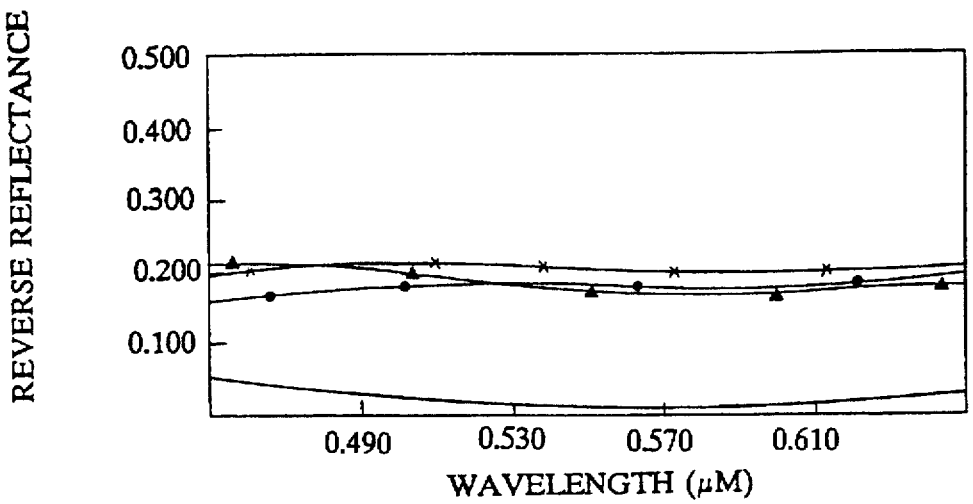
FIG. 9 shows a graph of the reverse reflectances of the coloured logos incorporating an anti-reflection layer.

FIG. 9 depicts the reverse reflectances of these four designs, showing the reduction in reverse reflectance from close to 40% to about 15% at 550 nm and appreciably less for the neutral design.

By using two or more masking procedures it is possible to create two or more different coloured patterns or logos on one background. Referring to Table 2, layers 2 and 3 can be combined into a common layer, as is described in Table 1, and the colours of the logos and the background are therefore defined by the thickness of layer 1. For example, a blue and a purple coloured logo can be formed on a gold coloured background.

Changes in background colour can be achieved by using rotating or stationary masks in front of the substrates during the coating process to create a variation of thickness of the dielectric layers. This process will produce a variation in the transmittance. Consequently, the masks will have to be removed while coating the metal layer.

If the entrance medium of the filter designs is made the same as the exit medium a symmetrical design can be created with different reflectances but the same transmittance, as is explained by the following table:

TABLE 3

| Layer | Material | Design 1 | Design 2 |
|---|---|---|---|
| Medium | BK7 | BK7 | BK7 |
| 1 | SiO | 15 nm | — |
| 2 | Cr | 21 nm | 21 nm |
| 3 | SiO | — | 15 nm |
| Substrate | BK7 | BK7 | BK7 |

The transmittances of the two designs are identical, but the reflectances differ, which will give a colour contrast looking from one side.

Figure 10:
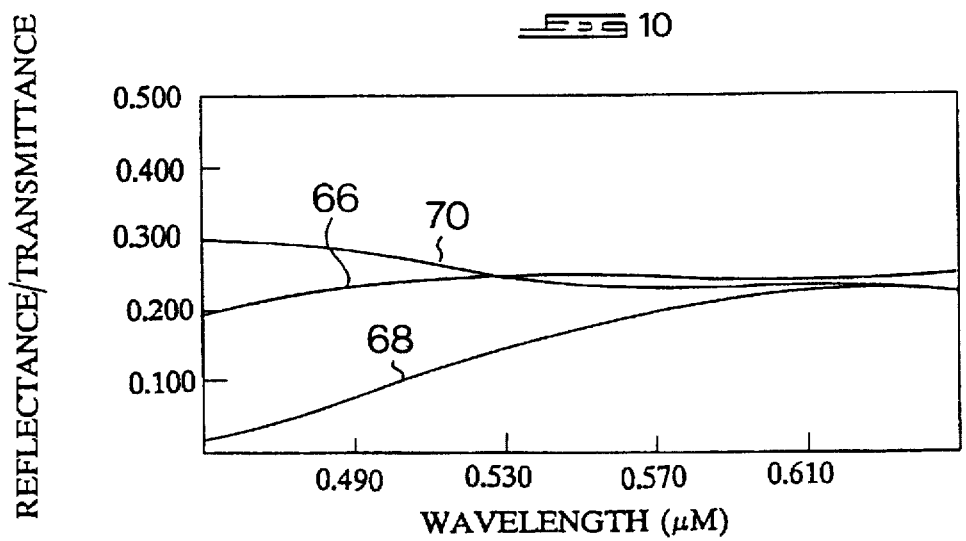
FIG. 10 shows a graph of the transmittances and the reflectances of an embedded pattern design utilising a substantially symmetrical optical filter arrangement.

FIG. 10 shows the transmittances and reflectances of the two designs, one of which will have a bronze reflection and the other a light blue reflection. The common transmittance plot is indicated at 66, the bronze reflectance plot is indicated at 68 and the blue plot at 70. The thickness of the SiO layer determines the colour of reflection.

Referring now to FIG. 12, a partly schematic view of an experimental coating plant 80 is shown comprising a vacuum chamber 82 having an outlet 84 leading to a vacuum pump and three windows 86, 88 and 90. An adjustable light source 92 is coupled to the window 86, and comprises a lamp 94, a focusing lens 96 and a light chopper 98 to eliminate background interference. An optical detection arrangement 100 is coupled to the window 88, and includes a filter 102, a lens 104 and a detector 106. A similar optical detector arrangement 108 is coupled to the window 90, and is arranged to detect reflected light.

The chamber holds a rotating substrate holder or calotte, which is indicated in broken outline at 110, and which carries at least one substrate 112. A transparent monitoring substrate 114, which may either be formed from glass or a suitable plastics material, is carried on a stationary mount at the centre of the calotte and constitutes the focal point of the optical transmission and detection arrangements. A glow discharge electrode 116 is housed within the chamber, and is used for a preliminary cleaning by electron bombardment prior to coating of the substrate in order to improve adhesion of the layers to the substrate. Two resistance-heated evaporation sources, one of which is shown at 118, are also contained within the chamber. A quartz crystal thickness monitoring arrangement 122 comprises a sensing head 124 located adjacent the substrate 112 and coupled to a monitoring device 126. A central controller and measuring device 128 controls the optical transmitter and receives and processes the optical inputs from the optical detection arrangements 100 and 108.

Cr was evaporated from a flat tungsten boat and SiO from a folded molybdenum or tantalum boat. The pressure in the vacuum chamber was less than 0.01 Pa, and the Cr and SiO were coated at an evaporation rate of approximately 1 nm per second. A glow discharge was performed for approximately five minutes prior to each coating being applied, and the thickness values of the different layers on the monitoring substrate 114 were monitored by the monitoring arrangement 122 or the optical monitoring system constituted by the optical transmitter 92, the optical receivers 100 and 108 and obtained by a calibration procedure.

Table 4 below sets out the initial experimental designs based on the theoretical designs of Table 1:

TABLE 4

| Layer | Material | Neutral | Bronze | Purple | Blue |
|---|---|---|---|---|---|
| 0 | Air | — | — | — | — |
| 1 | SiO | — | 42 nm | 55 nm | 72 nm |
| 2(a) | Cr | 14.9 nm | 14.9 + | 14.9 + | 14.9 + |
| 2(b) | Cr | — | 6.4 nm | 7.8 nm | 6.0 nm |
|  |  |  | (= 21.3) | (= 22.7) | (= 20.9) |
| Substrate | BK7 | BK7 | BK7 | BK7 | BK7 |

A neutral pattern or logo on a coloured background was formed in the following way. First, a SiO layer of 14.9 nm was coated over the whole of the substrate. Subsequently, the logo design or pattern was generated either by positioning a mask over the substrate, by painting on the logo or by creating the logo using a transfer medium such as Letraset or the like. An additional Cr layer was then coated to correct for the transmission mismatch and a SiO layer was subsequently applied to create the correct background colour. The masking defining the logo was then removed with a suitable solvent such as acetone.

FIG. 13 is a physical representation of Table 4 indicating the BK7 substrate 46, the 2(a) layer of chromium, the 2(b) layers of chromium, and the 42 nm bronze, 55 nm purple and 72 nm blue layers of SiO making up layer 1. The 2(a) layer, in combination with the 2(b) layer underlying the bronze reflecting area effectively constitutes a first metallic thin film, with the second metallic thin film being constituted by one of the following, namely layer 2(a) on its own, or layer 2(a) in combination with the overlying 2(b) layer beneath the purple or blue reflecting areas.

In a further application in which coloured logos were applied to coloured backgrounds, the three different colours listed in Table 4 were used as designs. It can be noted from Table 4 that the Cr layers differ in thickness in order to normalise the transmittances to 30% at 550 nm.

Referring back to FIG. 6, the spectral transmittance curves for the designs tabulated in Table 4 are illustrated.

Although the transmittances are matched at 550 nm, it is clearly evident that spectral mismatching exists. In order to simplify the procedure, all the Cr layers in Table 4 were made the same thickness, resulting in the following design:

TABLE 5

| Layer | Material | Bronze Thickness | Purple Thickness | Blue Thickness |
|---|---|---|---|---|
| 0 | Air | — | — | — |
| 1 | SiO | 42 + 0 = 42 nm | 42 + 13 = 55 nm | 42 + 30 = 72 nm |
| 2 | Cr | 21.3 nm | 21.3 nm | 21.3 nm |
| Substrate | BK7 | BK7 | BK7 | BK7 |

Figure 11:
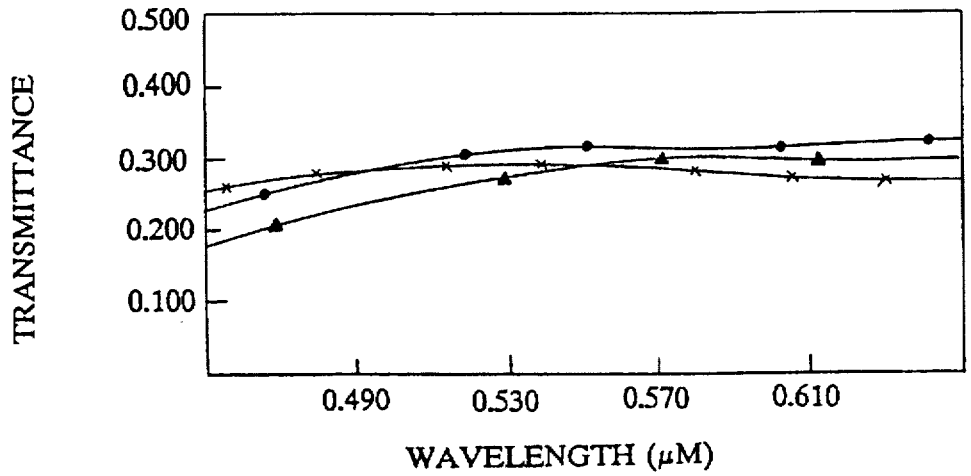
FIG. 11 shows a graph of non-normalised transmittance values for bronze, purple and blue filters.

Referring now to FIG. 11, the various transmittance values obtained using the above designs are indicated, with the plots in respect of the bronze, purple and blue filters being shown as before. Although the transmittances are slightly mismatched at 550 nm, this is not enough to influence the performance of the filter arrangement appreciably. The Cr layer in combination with the thinnest of the SiO layers acts as a common layer, after which the pattern, followed by the SiO layer, is applied.

Before any coatings can be applied, calibration of the thicknesses of the different materials is necessary. This is done by coating an arbitrary thickness of Cr, measuring the transmittance and correcting until the transmittance is about 30% at 550 nm. Any other transmittance value can be implemented with a minor change in thicknesses of the layers.

The calibration of the SiO is performed by coating an arbitrary thickness on a Cr layer, measuring the spectral reflectance and adjusting the thickness until the right colour for the background is achieved. Matching of the additional correcting Cr layer on the background has to be done as well by adjusting this layer until the transmittance through the logo and the background matches. The calibration procedure applies to the coating of the other coloured backgrounds as well, as a result of which recalibration for the other backgrounds will be necessary.

The following process was used in order to apply a neutral logo or pattern on a coloured background:

1) The substrates were cleaned with ethanol and acetone in a filtered laminar flow cabinet.

2) The cleaned substrates were loaded into the vacuum chamber.

3) The vacuum chamber was evacuated to a vacuum of less than 0.01 Pa.

4) Just before coating, the substrates were subjected to a glow discharge for about five minutes.

5) A 14.9 nm layer of Cr was coated at a rate of approximately 1.0 nm/sec, either controlled with a quartz crystal monitor, or until the transmittance was 30% when using an optical monitor.

6) The coating plant was vented to atmosphere.

7) The mask defining the pattern was applied.

8) The substrates were loaded again.

9) The vacuum plant was evacuated again to less than 0.01 Pa.

10) A glow discharge was performed for about 2 minutes.

11) An additional 10.5, 10 or 7.5 nm layer of Cr was coated, again using either a quartz crystal monitor or an optical monitor until the transmittance was approximately 20%. Thereafter a 42, 55 or 72 nm layer of SiO was coated, and the thickness was monitored with a calibrated quartz crystal monitor or with an optical monitor in reflection mode until the reflection signal reached a minimum with a specific narrowband filter.

12) The coating plant was vented to atmosphere.

13) The substrates were removed from the vacuum chamber.

14) The mask was removed.

Note: If a separate mechanical mask pattern is used that can be moved in front of the substrates while under vacuum, steps 6) to 10) can be eliminated.

The same process can be used to form filter arrangements comprising a coloured logo on differently coloured backgrounds or substrates, in which case the common layer is a 21.3 nm Cr layer plus a 42 nm SiO layer. The background colour is then determined by the thickness of the additional SiO layer surrounding the patterned area. This process applies in particular to a bronze coloured logo on purple and blue backgrounds.

Applying more than one coloured logo on a specific background entails more than one masking process. The 21.3 nm Cr layer is the common layer. The colour of the background is determined by a certain thickness of SiO. The first masking step is then applied, followed by the application of a further layer of SiO which determines the colour of the first logo. The second masking step is performed and an additional layer of SiO applied to determine the colour of the second logo. This process can be repeated to create further colours of logos.

Any other material with similar optical properties to Cr and SiO can be used, such as zinc sulphide or zirconium dioxide or the like.

Some of the designs referred to above have a small amount of mismatch, which will not influence the optical performance of the filters, but which may be picked up by the human eye. It is thus relatively difficult to align two designs perfectly without being noticeable. Such designs may be used in sunglasses applications, where the boundary between the pattern and the surround will be out of focus and consequently invisible for all practical purposes.

The masking procedure can be performed using the following techniques:

(a) Mechanical masks that have been cut to shape;

(b) marks painted on and removed afterwards by dissolving;

(c) marks printed on by ink jet printing techniques or laser printers;

(d) masks applied using silkscreening techniques;

(e) photographic processes such as photo-etch techniques; or (f) any other obscuration technique.

The optical filter arrangement of the invention has numerous possible applications. Typical examples include:

the windscreens and windows of motor vehicles, locomotives, aeroplanes, boats and any other forms of land, sea and air transport;

visors for helmets and the like, sunglasses, goggles, spectacles and possibly contact lenses;

all forms of architectural glass, including windows, shopfronts, sliding doors and advertising panels;

optical lenses and filters used in cameras, telescopes, binoculars and the like;

lights, bulbs, lamps and the like; and transparent plastics films and any other transparent constructions such as skylights and sun-roofs.

We claim:

1. An optical filter arrangement comprising a substrate, a first reflecting area defined by at least a first reflecting layer overlying the substrate and arranged to reflect at least a first waveband of light in the visible spectrum between 450 nm and 650 nm from a reflecting side of the filter arrangement, a second reflecting area adjacent the first reflecting area and defined by at least a second reflecting layer overlying the substrate and being arranged to reflect at least a second waveband of visible light from the reflecting side of the filter arrangement, and at least one transmission balancing means arranged to compensate for transmission mismatch in visible light transmitted through the first and second reflecting layers, whereby the distinction between the first reflecting area and the second reflecting area is visually perceptible when viewed from the reflecting side of the filter arrangement, and is substantially visually imperceptible when viewed through the filter arrangement from an opposite side thereof, wherein the transmission balancing means comprises at least a first metallic thin film of a predetermined thickness, and a second metallic thin film of the same material as the first metallic thin film and of a predetermined thickness which is different to the predetermined thickness of the first metallic thin film, and wherein the first reflecting layer includes a first reflecting surface defined by the first metallic thin film, in conjunction with at least a first optical thins film overlying the first reflecting surface, the thickness of the first optical thin film determining the particular first waveband or color of light being reflected off the first reflecting area, and the second layer includes at least the second metallic thin film.

2. An optical filter arrangement according to claim 1 in which the second reflecting layer includes a second reflecting surface defined by the second metallic thin film, in conjunction with at least a second optical thin film overlying the second reflecting surface, the thickness of the second optical thin film being different to the thickness of the first optical thin film, and the thickness of the second optical thin film determining the particular second waveband or color of light being reflected off the second reflecting area.

* * * * *

UNITED STATES PATENT AND TRADEMARK OFFICE
CERTIFICATE OF CORRECTION

PATENT NO. : 5,731,898
DATED : March 24, 1998
INVENTOR(S) : Domenico Orzi

It is certified that error appears in the above-identified patent and that said Letters Patent is hereby corrected as shown below:

In column 3, line 66, replace "dearly" with --clearly--.

In column 4, lines 35 and 54, replace "dear" with --clear--.

In column 5, line 24, replace "Fibre" with "FIG.".

In column 9, line 54, replace "see" with --sec--.

Signed and Sealed this

Sixth Day of October, 1998

Attest:

BRUCE LEHMAN

Attesting Officer

Commissioner of Patents and Trademarks